US010169744B2

(12) United States Patent
Akashika

(10) Patent No.: US 10,169,744 B2
(45) Date of Patent: Jan. 1, 2019

(54) PAYMENT SYSTEM AND PAYMENT TERMINAL

(71) Applicant: Rakuten, Inc., Shinagawa-ku, Tokyo (JP)

(72) Inventor: Hideki Akashika, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 196 days.

(21) Appl. No.: 14/348,229

(22) PCT Filed: Sep. 28, 2012

(86) PCT No.: PCT/JP2012/075211
§ 371 (c)(1),
(2) Date: Mar. 28, 2014

(87) PCT Pub. No.: WO2013/047816
PCT Pub. Date: Apr. 4, 2013

(65) Prior Publication Data
US 2014/0229371 A1     Aug. 14, 2014

(30) Foreign Application Priority Data
Sep. 30, 2011   (JP) .................................. 2011-218435

(51) Int. Cl.
*G06Q 20/10* (2012.01)
*G06Q 20/06* (2012.01)
(Continued)

(52) U.S. Cl.
CPC ......... *G06Q 20/10* (2013.01); *G06Q 20/0655* (2013.01); *G06Q 20/3226* (2013.01); *G06Q 20/407* (2013.01)

(58) Field of Classification Search
CPC ............................... G06Q 20/00; G06Q 20/06
(Continued)

(56) References Cited

U.S. PATENT DOCUMENTS

| 2002/0019806 | A1* | 2/2002 | Tamura | G06Q 20/06 705/39 |
| 2007/0272752 | A1* | 11/2007 | Nakatsugawa | G06F 21/35 235/451 |
| 2013/0332584 | A1* | 12/2013 | Sun | H04L 61/251 709/219 |

FOREIGN PATENT DOCUMENTS

| JP | 2002117362 A | 4/2002 |
| JP | 2007317076 A | 12/2007 |

(Continued)

OTHER PUBLICATIONS

Translation of International Preliminary Report on Patentability dated Apr. 10, 2014 issued in Application No. PCT/JP2012/075211.

(Continued)

*Primary Examiner* — Robert R Niquette
*Assistant Examiner* — Liz P Nguyen
(74) *Attorney, Agent, or Firm* — Sughrue Mion, PLLC

(57) ABSTRACT

A payment system (100) includes a mobile terminal (1) that includes a plurality of payment means that makes payments and a reader/writer (3) that includes an inquiry means configured to sequentially make inquiries to the mobile terminal (1) about each of a plurality of acceptable payment means and accepts a payment with one payment means specified among available payment means found by the inquiry means by using a payment processing means corresponding to the one payment means, and the mobile terminal (1) further includes a mobile application (14) that temporarily disables one or more payment means among the plurality of payment means in response to an external request.

12 Claims, 10 Drawing Sheets

(51) Int. Cl.
*G06Q 20/32* (2012.01)
*G06Q 20/40* (2012.01)

(58) Field of Classification Search
USPC .......................................................... 705/39
See application file for complete search history.

(56) References Cited

FOREIGN PATENT DOCUMENTS

| JP | 2008016016 A | 1/2008 |
| JP | 2009176065 A | 6/2009 |
| JP | 200999076 A | 7/2009 |
| JP | 2010271889 A | 2/2010 |
| WO | 2008149982 A | 11/2008 |

OTHER PUBLICATIONS

International Search Report dated Dec. 25, 2012 issued in Application No. PCT/JP2012/075211.

* cited by examiner

PAYMENT SYSTEM AND PAYMENT TERMINAL

CROSS REFERENCE TO RELATED APPLICATIONS

This application is a National Stage of International Application No. PCT/JP2012/075211 filed Sep. 28, 2012, claiming priority based on Japanese Patent Application No. 2011-218435 filed Sep. 30, 2011, the contents of all of which are incorporated herein by reference in their entirety.

TECHNICAL FIELD

The present invention relates to a payment system, a payment terminal, a payment processing method, a payment method, a payment program, and a computer-readable recording medium for recording same program.

BACKGROUND ART

A device capable of having a plurality of types of electronic money functions to be used for payments is proposed. The IC chip in the mobile device disclosed in Patent Literature 1 is equipped with a plurality of applications for electronic money service providers (electronic money functions).

For example, when a payment is made at a store, the mobile device is placed on an electronic money terminal located in the store, and the electronic money terminal sequentially makes inquiries to the IC chip of the mobile device about whether the IC chip is equipped with the electronic money functions that are available in the electronic money terminal. Then, the electronic money terminal displays the electronic money types available in the electronic money terminal, which are found as a result of the inquiries, among the electronic money functions incorporated in the mobile device on a display device and allows a user of the mobile device to select one electronic money to use.

CITATION LIST

Patent Literature

Patent Literature 1: Japanese Unexamined Patent Application Publication No. 2009-176065

SUMMARY OF INVENTION

Technical Problem

In the system disclosed in Patent Literature 1, electronic values that are less likely to be selected by a user (for example, a value which a user does not intend to use, a value which is not suitable for use due to insufficient balance and the like) are also unexceptionally recognized as usable values in the terminal having a function of sequentially making inquiries about usable electronic values. This requires a user to take the trouble to make selection among choices including a value that is less likely to be selected.

The problem to be solved by the present invention is to prevent the occurrence of the problem that a payment means less likely to be selected by a user is recognized as a usable payment means in a terminal having a function of sequentially making inquiries about usable electronic values.

Solution to Problem

A payment system according to one aspect of the invention includes a payment terminal that includes a plurality of payment means configured to make payments, and a payment processing terminal that includes an inquiry means configured to sequentially make inquiries to the payment terminal about each of a plurality of acceptable payment means and accepts a payment with one payment means specified among available payment means found by the inquiry means by using a payment processing means corresponding to the one payment means, wherein the payment terminal further includes a disabling means configured to temporarily disable one or more payment means among the plurality of payment means in response to an external request.

In the payment system according to another aspect, when only one payment means is found by the inquiry means, the payment processing terminal may automatically specify the one payment means and accept a payment with the one payment means by using the payment processing means corresponding to the one payment means.

In the payment system according to another aspect, the payment terminal may further include a means configured to request the disabling means to disable other payment means excluding one specific payment means selected among the payment means included in the payment terminal.

In the payment system according to another aspect, the payment terminal may further include a disabled object balance reduction means configured to, when any of the other payment means to be disabled by the disabling means has an electronic value function that stores an electronic value balance and changes the balance using specific balance change information, transmit specific balance change information for reducing at least a part of the electronic value balance in the payment means to the payment means before the payment means having the electronic value function is disabled by the disabling means, and a monetary value adding means configured to add a monetary value equal to an amount to be reduced by the disabled object balance reduction means as a monetary value usable for payments with the selected one specific payment means.

In the payment system according to another aspect, when the selected one specific payment means has the electronic value function, the monetary value adding means may transmit specific balance change information for increasing the electronic value balance in the one specific payment means by an amount equal to the amount to be reduced by the disabled object balance reduction means to the one specific payment means.

In the payment system according to another aspect, only when the electronic value balance in the selected one specific payment means is equal to or less than a specified amount, the monetary value adding means may transmit specific balance change information for increasing the electronic value balance in the one specific payment means by an amount equal to the amount to be reduced by the disabled object balance reduction means to the one specific payment means.

In the payment system according to another aspect, the payment terminal may further include a latest balance acquisition means configured to, when any of the other payment means to be disabled by the disabling means has an electronic value function that stores an electronic value balance and changes the balance using specific balance change information, acquire the electronic value balance related to the payment means immediately before the payment means having the electronic value function is disabled by the disabling means, a reserve fund adding means configured to add a reserve fund usable for payments with the selected one specific payment means within a range of the balance acquired by the latest balance acquisition means after the payment means having the electronic value function is disabled by the disabling means, and a security balance reduction means configured to, when the reserve fund is used for a payment with the selected one specific payment means by the payment processing means corresponding to the payment means, transmit specific balance change information for reducing the electronic value balance in the payment means by an amount equal to an amount of use of the reserve fund to the payment means after the disabling of the payment means having the electronic value function by the disabling means is cancelled.

In the payment system according to another aspect, the payment terminal may further include a storage means configured to store order information indicating an order of priority of payment means usable for payments in the payment terminal, a specifying information acquisition means configured to acquire specifying information corresponding to position information indicating a current position of the payment terminal acquired by a positioning means from a specifying information storage means configured to store specifying information specifying one or a plurality of payment means acceptable in the payment processing terminal located near a position in association with position information indicating the position, and a means configured to request the disabling means to select one payment means with a highest order of priority indicated by the order information stored in the storage means among one or a plurality of payment means specified by the specifying information acquired by the specifying information acquisition means and disable other payment means excluding the selected one payment means.

In the payment system according to another aspect, the payment terminal may include a means configured to store the payment means and time when a payment is made with the payment means in association with each other into a payment history storage mans, and a means configured to store a position of the payment terminal measured by a measurement means and time when the position is measured in association with each other into a position storage means, and the payment terminal may refer to the payment history storage mans and the position storage means, and select one payment means among the plurality of payment means based on a history of tendency of the payment means having been used near a current position of the payment terminal acquired by the positioning means.

In the payment system according to another aspect, the payment terminal may further include an input means configured to accept input of specifying information specifying the other payment means to be disabled by the disabling means, and the disabling means may disable the other payment means excluding one payment means selected among the plurality of payment means based on the specifying information input by the input means.

In the payment system according to another aspect, the payment terminal may further include a balance acquisition means configured to, when at least any one of the plurality of payment means has the electronic value function, acquire the electronic value balance related to the payment means having the electronic value function each at specified timing, and a means configured to cause the disabling means to disable a payment means where the balance acquired by the balance acquisition means is equal to or less than a specified threshold.

A payment terminal according to one aspect of the invention may further include a balance acquisition means configured to, when at least any one of the plurality of payment means has the electronic value function, acquire the electronic value balance related to the payment means having the electronic value function each at specified timing, and a means configured to cause the disabling means to disable a payment means where the balance acquired by the balance acquisition means is equal to or less than a specified threshold.

A payment processing method according to one aspect of the invention is a payment processing method in a payment system including a payment terminal that includes a plurality of payment means configured to make payments, and a payment processing terminal that includes an inquiry means configured to sequentially make inquiries to the payment terminal about each of a plurality of acceptable payment means and accepts a payment with one payment means specified among available payment means found by the inquiry means by using a payment processing means corresponding to the one payment means, the method including a disabling step of temporarily disabling one or more payment means among the plurality of payment means in response to an external request in the payment terminal.

A payment method according to one aspect of the invention is a payment method by a payment terminal including a plurality of payment means configured to make payments, the method including a disabling step of temporarily disabling one or more payment means among the plurality of payment means in response to an external request, so that each of available payment means having received an inquiry from a payment processing terminal that includes an inquiry means configured to sequentially make inquiries to the payment terminal about each of a plurality of acceptable payment means and accepts a payment with one payment means specified among available payment means found by the inquiry means by using a payment processing means corresponding to the one payment means makes a specified response.

A payment processing program according to one aspect of the invention causes a computer serving as a payment terminal including a plurality of payment means configured to make payments to implement a disabling function of temporarily disabling one or more payment means among the plurality of payment means in response to an external request, so that each of available payment means having received an inquiry from a payment processing terminal that includes an inquiry means configured to sequentially make inquiries to the payment terminal about each of a plurality of acceptable payment means and accepts a payment with one payment means specified among available payment means found by the inquiry means by using a payment processing means corresponding to the one payment means makes a specified response.

A computer-readable recording medium according to one aspect of the invention stores a payment program causing a computer serving as a payment terminal including a plurality of payment means configured to make payments to implement a disabling function of temporarily disabling one or more payment means among the plurality of payment means in response to an external request, so that each of available payment means having received an inquiry from a payment processing terminal that includes an inquiry means configured to sequentially make inquiries to the payment terminal about each of a plurality of acceptable payment means and accepts a payment with one payment means specified among available payment means found by the inquiry means by using a payment processing means corresponding to the one payment means makes a specified response.

Advantageous Effects of Invention

According to the invention, a payment means that is less likely to be selected by a user is temporarily disabled, and it is thus possible to prevent the occurrence of the problem that a payment means less likely to be selected by a user is recognized as a usable payment means in a terminal having a function of sequentially making inquiries about usable electronic values.

DESCRIPTION OF EMBODIMENTS

Embodiments of the present invention are described hereinafter in detail with reference to the appended drawings. Note that, in the description of the drawings, the same or equivalent elements are denoted by the same reference symbols, and the redundant explanation thereof is omitted.

<1> First Embodiment

<1-1> Outline of Processing Procedure in Payment System

Figure 1:
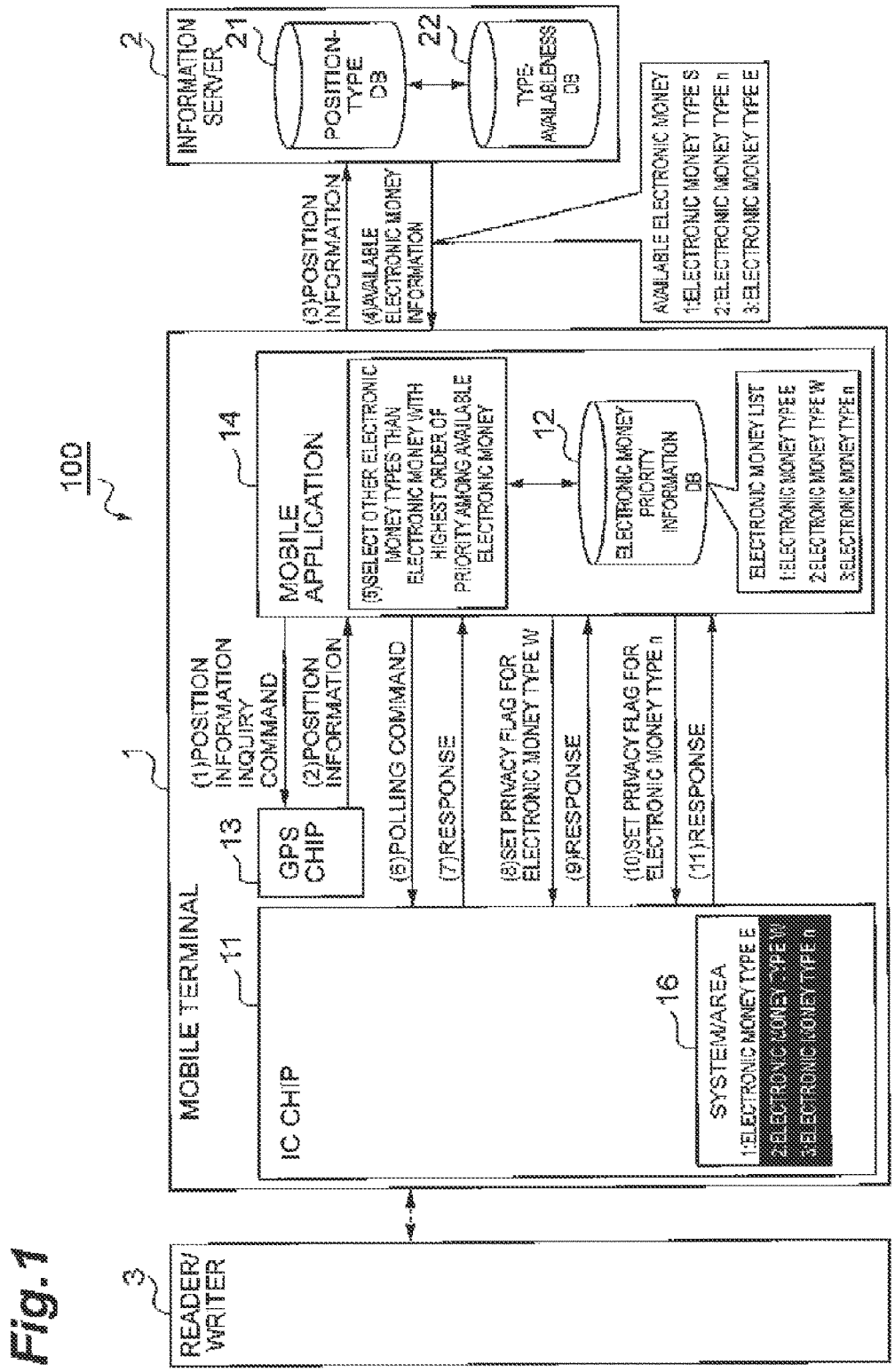
FIG. 1 is a procedure explanatory diagram illustrating the procedure of a preparation process performed prior to a payment process in a payment system according to a first embodiment.
Figure 2:
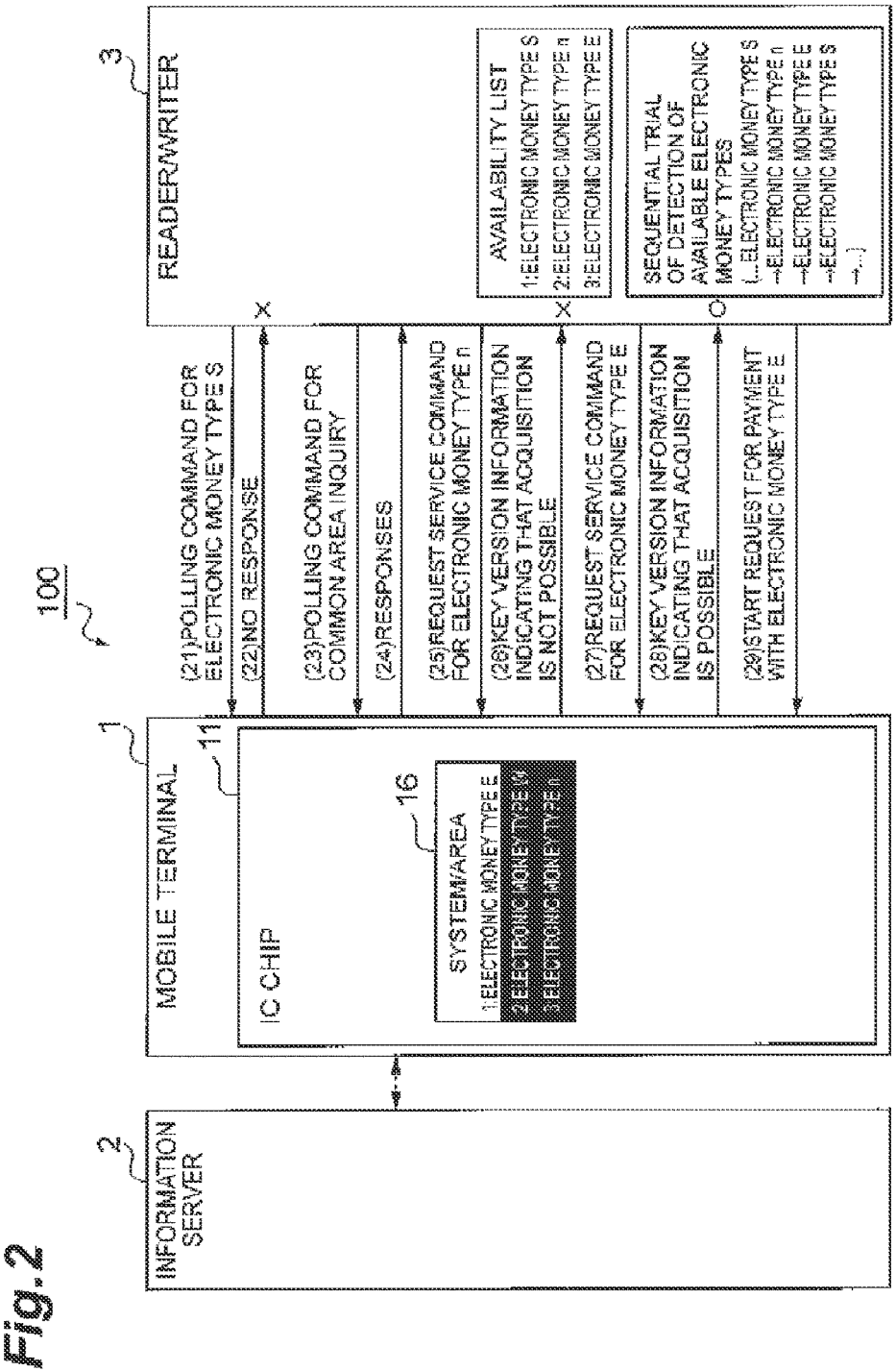
FIG. 2 is a procedure explanatory diagram illustrating a part of the procedure of the payment process in the payment system after the preparation process.

First, a payment system according to the present invention is described with reference to FIGS. 1 and 2. FIG. 1 is a procedure explanatory diagram illustrating the procedure of a preparation process performed prior to a payment process in the payment system 100, and FIG. 2 is a procedure explanatory diagram illustrating a part of the procedure of the payment process in the payment system 100 after the preparation process.

The payment system 100 is a system that includes a mobile terminal 1 (one example of a payment terminal), an information server 2, and a reader/writer 3 (one example of a payment processing terminal). The mobile terminal 1 is a terminal that makes a payment with an electronic payment function (prepaid stored-value electronic money function, postpaid stored-value electronic money function, prepaid center management electronic money function, credit function etc., any of which is an example of payment means; which are collectively referred to hereinafter as "electronic money", "electronic money type" and the like), such as a mobile phone terminal or a smartphone with electronic money functionality, for example. The information server 2 is a server device that includes a database that stores information required for a preparation process performed prior to the above-described payment process. The reader/writer 3 is a device that is placed in a POS (Point Of Sales) cash register or the like located in a store and the like and accepts a payment by the mobile terminal 1, and it is connectable with an IC chip by near field communication.

Note that the mobile terminal 1 includes a contactless IC chip 11 (one example of the payment terminal), an electronic money priority information database 12, a GPS chip 13, and a mobile application 14 (an application program for the mobile terminal 1; one example of a disabling means).

The IC chip 11 is an electronic module that includes a CPU (Central Processing Unit), ROM (Read Only Memory), RAM (Random Access Memory), EEPROM (Electrically Erasable Programmable Read Only Memory) and the like, and it is connectable with the reader/writer 3 by near field communication. Further, the IC chip 11 is connected with a CPU 101 of the mobile terminal 1 by wired.

Further, the IC chip 11 has a function of storing data and a function of executing a specified process in accordance with an externally input command and outputting a response in accordance with the command. For example, the payment process is implemented by the following methods (a) to (c).
(a) Store the balance of prepaid or postpaid electronic money into a predetermined storage area and read and output the balance in response to an externally input balance check command or change the balance in response to an externally input balance change command and output the processing result to thereby make a payment with the value stored in the IC chip.
(b) Store the identifier (account ID) of a value account, which is a unit of managing values in the center, into a predetermined storage area and read and output the account ID in response to an externally input account ID check command to thereby make a payment with the value stored in the center in association with the account ID.
(c) Store the user ID that identifies a user into a predetermined storage area and read and output the user ID in response to an externally input user ID check command to thereby make a payment within the range of the credit limit set to the user ID for each specified period.

Further, the IC chip 11 includes a flag storage area 16, which is a data storage area for storing a privacy flag indicating, for each given area in the IC chip 11, that the area is not valid. For example, the privacy flag can be stored for each set of logically grouped blocks where the block is the physical minimum unit (which is referred to as "system", "area" and the like in some technical specifications of the IC chip), for example.

The value of the privacy flag can be updated by a command input externally. For example, the privacy flag corresponding to a specified area (for example, a service, an area and the like) is set to a significant value according to a command for setting the privacy flag to ON (which is referred to hereinafter as "set privacy flag"). On the other hand, the privacy flag corresponding to a specified area (for example, a service, an area and the like) is reset to a default value according to a command for setting the privacy flag to OFF. This processing is executed by a control unit of the IC chip 11 (which is a functional unit formed by reading OS (Operating System) and an application program running on the OS to the CPU in the chip).

When the command that raises an access to a specific area is input from the outside, the control unit of the IC chip 11 refers to the flag storage area 16 and, if the privacy flag corresponding to the specified area has a significant value, the control unit does not output any response to the command (or outputs a response indicating that the area specified by the command does not exist). On the other hand, if the privacy flag corresponding to the specified area does not have a significant value, the control unit executes processing according to the command and outputs a response according to the command.

In this configuration, by setting the privacy flag for the area corresponding to a specific electronic money type (for example, the whole area storing data related to a specific electronic money type, the area storing data that is always referred to at the time of a payment with a specific electronic money type and the like) to a significant value (which is one example of disabling a payment means), it is possible to make the payment function with the electronic money type temporarily unavailable.

Note that the method of making the payment function with an electronic money type temporarily unavailable is not limited to the use of the privacy flag.

For example, in the case where the access control function for each given area is implemented in the IC chip 11, by controlling access to a specific electronic money type (for example, the whole area storing data related to a specific electronic money type, the area storing data that is always referred to at the time of a payment with a specific electronic money type and the like), it is possible to make the payment function with the electronic money type temporarily unavailable.

The electronic money priority information database 12 is a database that stores information about the order of priority at the time of making selection among the types of electronic money (electronic money types) that are usable in the mobile terminal 1. The GPS chip 13 is an electronic module that measures the position of the mobile terminal 1. The mobile application 14 is an application program that has the function of performing a preparation process by accessing the IC chip 11.

Further, the information server 2 includes a position-type database 21 and a type-availableness database 22. The position-type database 21 is a database that stores position information indicating a position and a terminal type indicating the type of a payment processing terminal located near the position in association with each other. The type-availableness database 22 is a database that stores a terminal type indicating the type of a payment processing terminal and an electronic money type indicating the type of electronic money (payment means) acceptable in that type of payment processing terminal in association with each other.

First, the procedure of a preparation process that is performed prior to a payment process in the payment system 100 is described with reference to FIG. 1. In the following, the case where a user of the mobile terminal 1 visits a store and eats and drinks, for example, and then makes a payment with electronic money is described as one example.

First, when a user of the mobile terminal 1 enters a store, the user holds the mobile terminal 1 against a reader/writer for discount coupon issuance (not shown) or the like that is located at the entrance of the store, for example. Upon that act as a trigger, information about a discount coupon is displayed on the mobile terminal 1, and the mobile application 14 transmits a command to make an inquiry about position information corresponding to the current position of the mobile terminal 1 to the GPS chip 13 (procedural step 1). Note that, instead of using the act that a user of the mobile terminal 1 holds the mobile terminal 1 against a reader/writer for discount coupon issuance or the like as a trigger, detection of identification information of an access point of a wireless LAN (so-called SSID) by the mobile terminal 1 may be used as a trigger, or the GPS chip 13 may perform positioning, which is described below, on a regular basis.

Next, the GPS chip 13 performs positioning and transmits position information indicating the current position of the mobile terminal 1 to the mobile application 14 (procedural step 2), and the mobile application 14 transmits the position information to the information server 2 (procedural step 3). Then, the information server 2 makes an inquiry to the position-type database 21 about a terminal type corresponding to the received position information and further makes an inquiry to the type-availableness database 22 about an electronic money type (available electronic money information as one example of specifying information) corresponding to the obtained terminal type. Then, the information server 2 transmits the obtained available electronic money information to the mobile terminal 1 (procedural step 4). It is assumed in this example that the available electronic money information specifies "electronic money type S", "electronic money type n" and "electronic money type E".

Then, the mobile application 14 refers to the electronic money priority information database 12 that has electronic money type priority information and selects the rest of electronic money types other than the electronic money type having the highest order of priority in the mobile terminal 1 among the electronic money types indicated by the received available electronic money information (procedural step 5). It is assumed in this example that the order of priority indicated by the electronic money type priority information is "electronic money type E", "electronic money type W" and "electronic money type n" from the highest to the lowest. Because the electronic money types other than the electronic money type having the highest order of priority (which is the "electronic money type E" in this example) in the electronic money type priority information among the available electronic money information are the "electronic money type W" and the "electronic money type n", the mobile application 14 selects the "electronic money type W" and the "electronic money type n" as the electronic money types to be disabled.

Then, the mobile application 14 sends a command (polling) for capturing the IC chip 11 (which does not designate a specific code) to the IC chip 11 (procedural step 6). In response thereto, the IC chip 11 sends a response containing unique ID information and the like back to the mobile application 14 (procedural step 7).

After that, it is assumed that a process in compliance with the technical specification and the management regulations of the IC card (for example, authentication etc.) is performed between the mobile application 14 and the IC chip 11, for example.

After that, in order to temporarily disable the "electronic money type W" and the "electronic money type n" selected as the types to be disabled, the mobile application 14 transmits the command for setting the privacy flag to ON (set privacy flag) to the IC chip 11 by specifying areas corresponding to the "electronic money type W" and the "electronic money type n" (procedural steps 8 and 10). In response thereto, the control unit of the IC chip 11 updates the privacy flag corresponding to each of the specified areas to ON, and sends a response indicating that update is normally done back to the mobile application 14 for each of them (procedural steps 9 and 11).

By the procedure shown in FIG. 1, the electronic money type having the highest order of priority (which is "electronic money type E" in the above example) among the electronic money types that are usable in the mobile terminal 1 (which are three types: "electronic money type E", "electronic money type W" and "electronic money type n" in the above example), out of the electronic money types that are acceptable in a payment processing terminal located near the current position of the mobile terminal 1 (which are three types: "electronic money type S", "electronic money type n" and "electronic money type E" in the above example), is selected, and the rest of electronic money types (which are two types: "electronic money type W" and "electronic money type n" in the above example) other than the selected electronic money type are temporarily disabled.

The procedure of the payment process in the payment system 100 is described hereinafter with reference to FIG. 2. In the following, the case where a user of the mobile terminal 1 has finished eating and drinking and makes a payment with electronic money is described as one example.

The following description is based on the assumption that the reader/writer 3 repeats the trial cycle that makes inquiries about electronic money types sequentially in the order of "electronic money type S", "electronic money type n" and "electronic money type E", for example.

FIG. 2 illustrates the payment process that is performed based on the following assumptions. Those are just one example, and the procedure of the payment process is designed in compliance with the technical specification and the management regulations of the IC card.

The area corresponding to the "electronic money type S" is specified by the first hierarchy code (system code). When there is a response to the polling command that designates the system code corresponding to the "electronic money type S", the presence of the "electronic money type S" is confirmed by the reader/writer 3.

The areas corresponding to the "electronic money type n", "electronic money type E" and "electronic money type W" are specified by the second hierarchy code (area code). When there is a response to the polling command that designates the system code of the area that includes the areas corresponding to those electronic money type and there is a specified response (for example, a response indicating a key version) to the request service command that designates the area code corresponding to one electronic money type, the presence of the one electronic money type is confirmed by the reader/writer 3.

First, a user of the mobile terminal 1 holds the mobile terminal 1 against the reader/writer 3 for the payment process. Upon that act as a trigger, the reader/writer 3 sends a command designating the system code corresponding to the "electronic money type S" to the IC chip 11 (procedural step 21). In this case, because the payment function with the "electronic money type S" does not exist, the IC chip 11 does not send a response (procedural step 22). Note that the IC chip 11 does not send a response in the case where the "electronic money type S" exists but is temporarily disabled as well.

Then, the reader/writer 3 sends a command (polling) designating the code corresponding to a second area to the IC chip 11 (procedural step 23). In response thereto, the IC chip 11 sends a response to the reader/writer 3 (procedural step 24).

Then, the reader/writer 3 sends a command (request service) designating the code corresponding to the "electronic money type n" to the IC chip 11 (procedural step 25). In response thereto, since the privacy flag corresponding to the "electronic money type n" is ON in the flag storage area 16, the IC chip 11 sends key version information indicating that there is no service corresponding to the designated code (to be specific, it is not possible to acquire key version of the service corresponding to the designated code) back to the reader/writer 3 (procedural step 26).

Then, the reader/writer 3 sends a command (request service) designating the code corresponding to the "electronic money type E" to the IC chip 11 (procedural step 27). In response thereto, since the privacy flag corresponding to the "electronic money type E" is not ON in the flag storage area 16, the IC chip 11 sends key version information indicating that there is a service corresponding to the designated code back to the reader/writer 3 (procedural step 28).

By the procedure shown in FIG. 2, the presence of one electronic money type (which is "electronic money type E" in the above example) that is usable in the mobile terminal 1 (the IC chip 11) among the electronic money types that are acceptable in a payment processing terminal (which are three types: "electronic money type S", "electronic money type n" and "electronic money type E" in the above example) is automatically found.

In this case, the reader/writer 3 skips the procedural step of letting the user select the electronic money type to be used for a payment and starts payment processing using the one electronic money type that is found to be present (which is "electronic money type E" in the above example) with the IC chip 11 (procedural step 29).

<1-2> Configuration of Payment System

Figure 3:
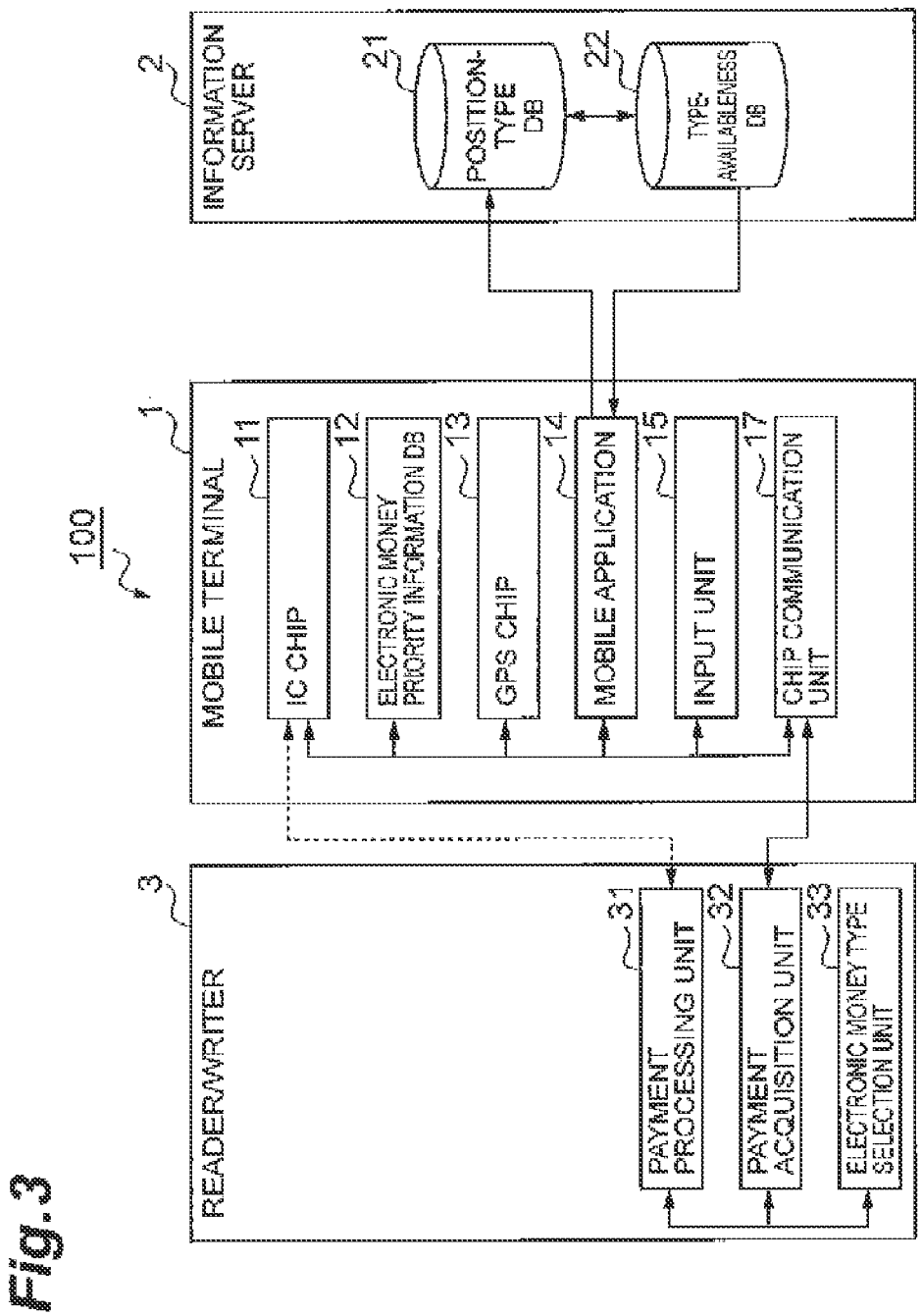
FIG. 3 is a block diagram illustrating the configuration of the payment system.

The configuration of the payment system 100 is described hereinafter with reference to FIGS. 3 to 5. FIG. 3 is a block diagram illustrating the configuration of the payment system 100, FIG. 4 is a block diagram showing the physical configuration of the mobile terminal 1 included in the payment system 100 (and a mobile terminal 4 included in the payment system 200, which is described later), and FIG. 5 is a block diagram showing the physical configurations of the reader/writer 3 included in the payment system 100.

Figure 4:
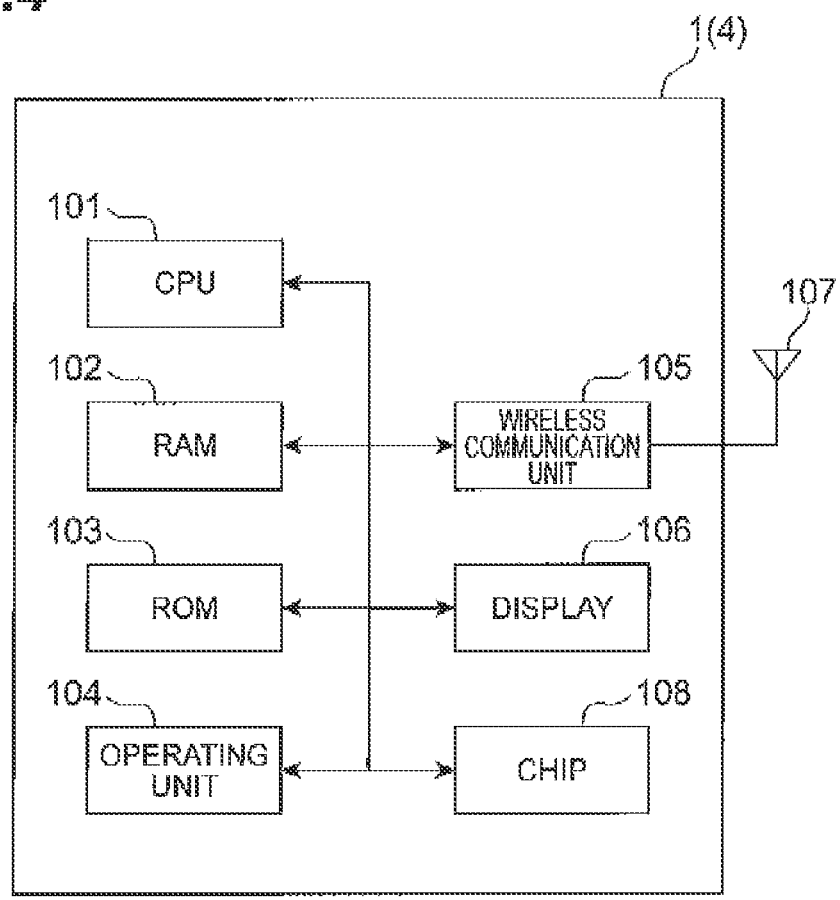
FIG. 4 is a block diagram showing the physical configuration of a mobile terminal included in the payment system.
Figure 5:
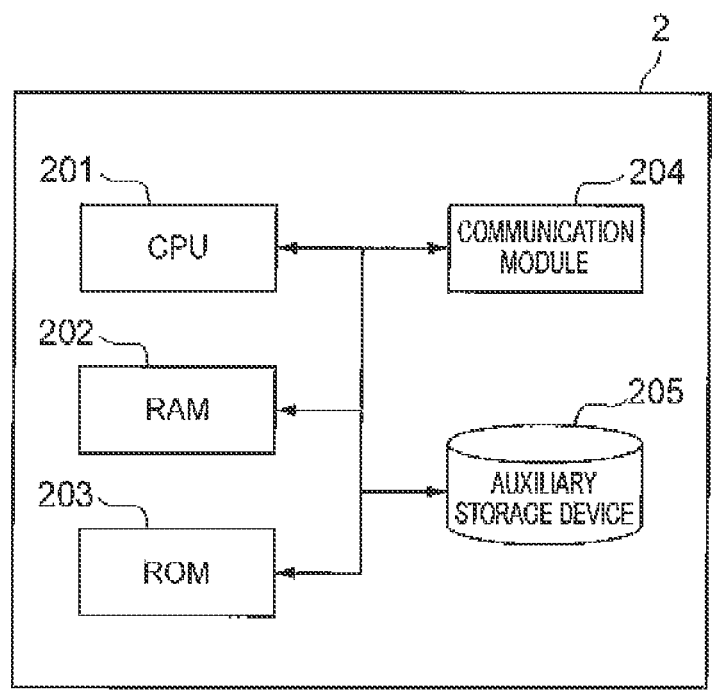
FIG. 5 is a block diagram showing the physical configuration of a reader/writer included in the payment system.

As shown in FIG. 4, the mobile terminal 1 is a small computer terminal that is composed of hardware such as a CPU 101 (Central Processing Unit), a RAM 102 (Random Access Memory), a ROM 103 (Read Only Memory), an operating unit 104, a wireless communication unit 105, a display 106, an antenna 107, and various chips 108 as principal physical components. Those components operate so that the functions of the mobile terminal 1 are exerted.

As shown in FIG. 3, the mobile terminal 1 is composed of the IC chip 11 (payment means), the electronic money priority information database 12 (storage means), the GPS chip 13 (positioning means), the mobile application 14 (control means), an input unit 15 (input means), and a chip communication unit 17 (communication means) as principal functional components.

The IC chip 11 is a semiconductor integrated circuit unit that is capable of making payments with a plurality of electronic money types. The plurality of electronic money types include "electronic money type E", "electronic money type W" and "electronic money type n", for example.

The electronic money priority information database 12 is a database unit that stores electronic money priority information (selection information) that specifies the order of priority for selection by the input unit 15 among a plurality of types of electronic money (electronic money types) that are usable in the mobile terminal 1. The electronic money priority information that specifies the order of priority for selection may be set to be registered in advance by a user of the mobile terminal 1, may be set to be registered automatically so that the higher priority is given to the electronic money type having the higher frequency of use, or may be set to be registered automatically so that the higher priority is given to the electronic money type with the higher balance (value balance) of electronic money.

The GPS chip 13 is a positioning unit that acquires position information related to the current position of the mobile terminal 1 and the date and time by using GPS (Global Positioning System).

The mobile application 14 is an application unit that transmits the position information acquired by the GPS chip 13 to the information server 2 to make an inquiry about available electronic money information corresponding to the position information and thereby acquires the available electronic money information.

Further, the mobile application 14 performs disabling processing (processing of switching between ON and OFF of the privacy flag stored in the flag storage area 16) for the rest of electronic money types excluding one specific electronic money type among a plurality of electronic money types in the mobile terminal 1 on the IC chip 11. Further, the mobile application 14 can perform the disabling processing based on specifying information, which is described later, received by the input unit 15.

Note that the mobile application 14 can perform disabling processing of the rest of electronic money types based on a tendency in the history of the current position of the mobile terminal 1 at certain date and time acquired by the GPS chip 13 and the electronic money type used at that date and time and that position. For example, in the case where there is a record indicating that the electronic money type E is used frequently at a specific business district (position) in the early weekday morning (date and time) and there is a tendency that the electronic money type W is used frequently at a specific entertainment district (position) in the holiday evening (date and time), the rest of electronic money types other than the type E are disabled (preset) when the position is detected at the business district in the early weekday morning, and the rest of electronic money types other than the type W is disabled (preset) when the position is detected at the entertainment district in the holiday evening.

The mobile application 14 has a payment processing function that executes payment processing with the electronic money type usable in the IC chip 11 in coordination with an electronic money server (not shown) corresponding to each electronic money type and an issuing function that issues a value for (charges) the electronic money type usable in the IC chip 11 in coordination with an electronic money server (not shown) corresponding to each electronic money type, and further stores key information required for access to the flag storage area 16 (for example, update of the privacy flag).

For example, at the time of performing the above-described disabling processing, when the electronic money balance (value balance) of one specific electronic money type is equal to or less than a specified amount, the mobile application 14 reduces at least a part of the electronic money balance of another electronic money types to be disabled and increases the electronic money balance of one specific electronic money type.

Further, for example, in the case where one specific electronic money type is post-pay electronic money, at the time of performing the disabling processing, the mobile application 14 can perform operation to add a reserve fund (the value balance that can be used for payment) to the remaining balance of the available amount of one specific electronic money type, using at least a part of the electronic money balance of another electronic money types to be disabled as security. In this case, the mobile application 14 (the mobile terminal 1) preferably connects and communicates with a given payment management server (not shown) and notifies that a certain amount of reserve fund has been set for the available amount.

Note that the reserve fund is the amount kept in reserve which is not used when a payment can be made within the available amount of post-pay electronic money in one specific electronic money type and used only when insufficient funds occur with the available amount of post-pay electronic money in one specific electronic money type and a payment cannot be made. In the case where the reserve fund is used, at the time of canceling the disabling of the electronic money type where the reserve fund is used, the mobile application 14 reduces the electronic money balance of the electronic money type by the amount of insufficient funds in coordination with the electronic money server corresponding to the electronic money.

The input unit 15 is a user interface unit that receives input of specifying information that specifies the rest of electronic money types to be disabled. The specifying information is input by a user of the mobile terminal 1.

The chip communication unit 17 is a communication unit that controls near field communication that is performed with the reader/writer 3.

As shown in FIG. 5, the information server 2 and the reader/writer 3 are configured as computers that include hardware such as a CPU 201 (Central Processing Unit), a RAM 202 (Random Access Memory) and a ROM 203 (Read Only Memory) serving as main storage devices, a communication module 204 for performing communication, and an auxiliary storage device 205 such as hard disk as principal physical components. Those components operate so that the functions of the information server 2 and the reader/writer 3 are exerted.

As shown in FIG. 3, the reader/writer 3 is composed of a payment processing unit 31 (payment processing means), a payment acquisition unit 32 (inquiry means), and an electronic money type selection unit 63 (selection means) as principal functional components.

The payment processing unit 31 is an electronic module that is capable of accepting payments with a plurality of electronic money types by the IC chip 11 using the corresponding payment processing function (payment processing means). The payment processing unit 31 holds an encryption key that is required for cipher communication performed with the IC chip 11 for each of the electronic money types. Further, the payment processing unit 31 has a function of generating a command for changing the balance of electronic money, a function of generating log data indicating the history of payments made with the IC chip, a function of transmitting the log data to a corresponding electronic money server (not shown) at predetermined timing and the like.

The payment acquisition unit 32 makes inquiries sequentially to the IC chip 11 and thereby specifies the electronic money types that are usable for payments in the IC chip 11 among the electronic money types that are acceptable in the payment processing unit 31.

The electronic money type selection unit 33 selects a payment function corresponding to one specific electronic money type designated among usable electronic money types specified by the payment acquisition unit 32 from the payment unit 31.

<1-3> Flow of Process in Payment System

Figure 6:
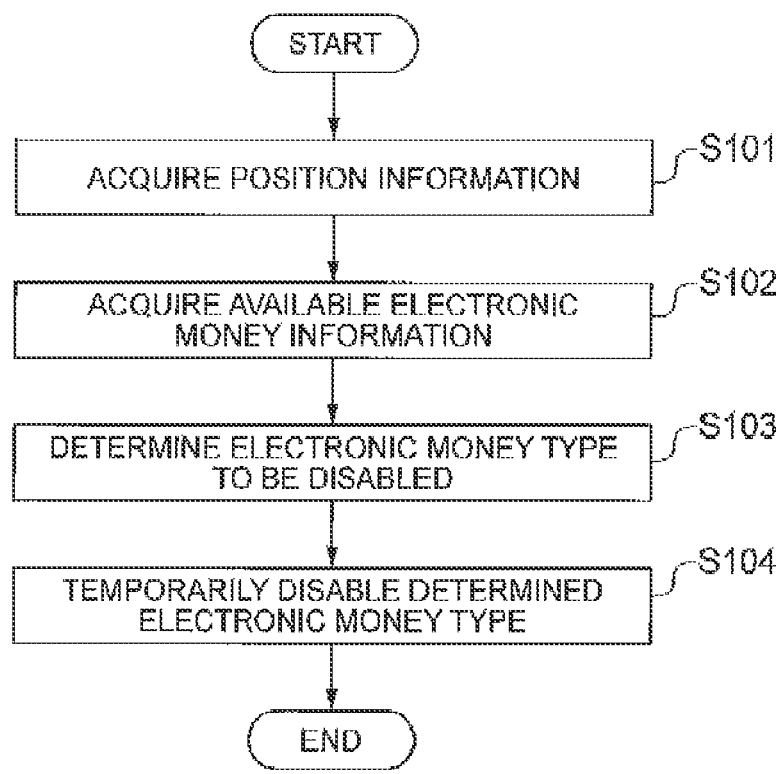
FIG. 6 is a flowchart showing the flow of the preparation process performed prior to the payment process in the payment system.
Figure 7:
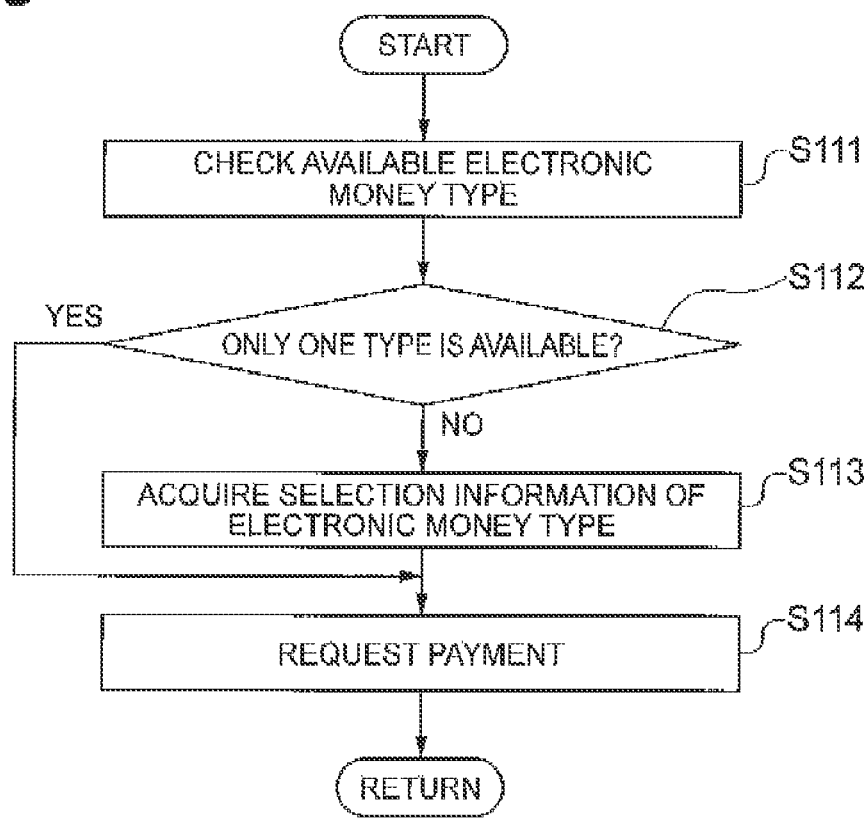
FIG. 7 is a flowchart showing a part of the flow of the payment process in the payment system after the preparation process.

The flow of the process (payment processing method) executed in the payment system 100 is described hereinafter with reference to FIGS. 6 and 7. FIG. 6 is a flowchart showing the flow of the preparation process performed prior to the payment process in the payment system 100, and FIG. 7 is a flowchart showing a part of the flow of the payment process in the payment system 100 after the preparation process.

First, the flow of the preparation process performed prior to the payment process in the payment system 100 is described hereinafter with reference to FIG. 6. In the following, the case where a user of the mobile terminal 1 visits a store and eats and drinks, for example, and then makes a payment with electronic money is described as one example.

First, when a user of the mobile terminal 1 enters a store, the user holds the mobile terminal 1 against a reader/writer for discount coupon issuance (not shown) or the like that is located at the entrance of the store, for example. Upon that act as a trigger, information about a discount coupon is displayed on the mobile terminal 1, and the mobile terminal 1 performs positioning, thereby acquires position information indicating the current position of the mobile terminal 1, and transmits it to the information server 2 (Step S101).

Then, the information server 2 makes an inquiry to the position-type database 21 about a terminal type corresponding to the received position information and further makes an inquiry to the type-availableness database 22 about an electronic money type (available electronic money information as one example of specifying information) corresponding to the obtained terminal type and thereby acquires and transmits the obtained available electronic money information to the mobile terminal 1 (Step S102). It is assumed in this example that the available electronic money information specifies "electronic money type S", "electronic money type n" and "electronic money type E".

Then, the mobile terminal 1 acquires the rest of electronic money types other than the electronic money type with the highest order of priority in the mobile terminal 1 among the electronic money types indicated by the received available electronic money information by making an inquiry to the electronic money priority information database 12 (Step S103).

After that, the mobile terminal 1 temporarily disables the rest of electronic money types other than the electronic money type which are selected to be disabled (Step S104).

By the procedure shown in FIG. 6, the electronic money type with the highest order of priority out of the electronic money types that are usable in the mobile terminal 1 among the electronic money types that are acceptable in the payment processing terminal located near the current position of the mobile terminal 1, and the rest of electronic money types other than the selected electronic money type are temporarily disabled.

A part of the flow of the payment process in the payment system 100 after the preparation process is described hereinafter with reference to FIG. 7.

First, a user of the mobile terminal 1 holds the mobile terminal 1 against the reader/writer 3 for the payment process. Upon that act as a trigger, the reader/writer 3 sequentially makes inquiries to the IC chip 11 of the mobile terminal 1 about available electronic money types (which are usable for payment) (Step S111). Next, the reader/writer 3 determines whether only one electronic money type is available or not in the he IC chip 11 of the mobile terminal 1 (Step S112). When it is determined that only one electronic money type is available (Yes in Step S112), the process proceeds to Step S114, which is described later.

On the other hand, when it is not determined that only one electronic money type is available (for example, a plurality of electronic money types are available) (No in Step S112), a list of electronic money types found to be available is displayed on a display screen or the like to let a user select the electronic money type to be used for a payment, and selection information that specifies the selected electronic money type is acquired (Step S113).

Then, the reader/writer 3 starts a request for a payment with the electronic money type that is determined to be available (Step S114). The payment process is thereby performed between the IC chip 11 of the mobile terminal 1 and the reader/writer 3.

<1-4> Payment Processing Program

A payment program as a payment processing program for causing computers to function as the mobile terminal 1 (and a payment program that controls the mobile terminal 14 of the payment system 200 according to the second embodiment, which is described later) is provided in the form of being recorded in a static manner on a recording medium such as CD-ROM, DVD-ROM or semiconductor memory, for example. Further, the payment program may be provided as computer data signals superimposed onto carrier waves through a communication network.

<2> Second Embodiment

<2-1> Outline of Processing Procedure in Payment System

Figure 8:
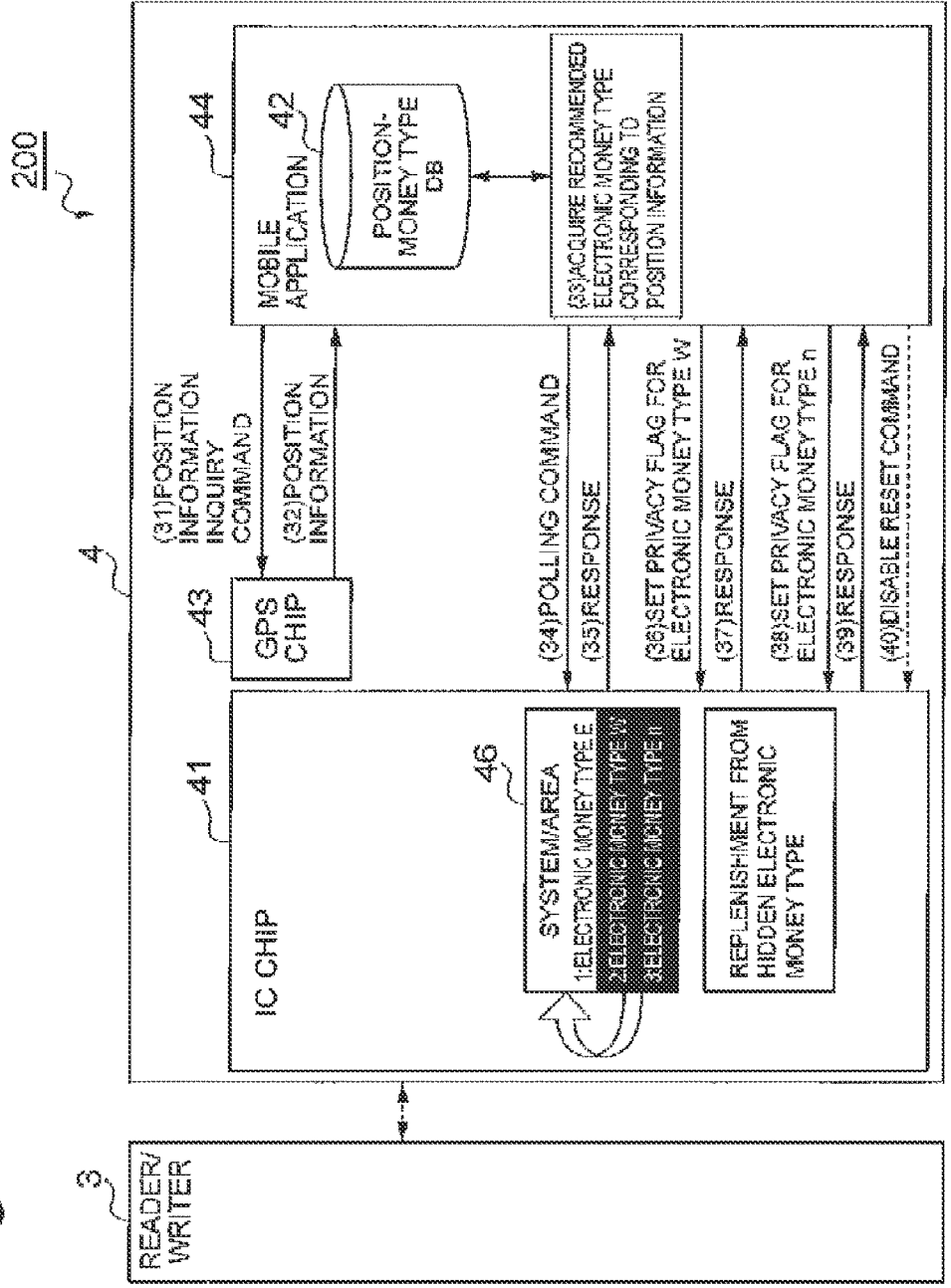
FIG. 8 is a procedure explanatory diagram illustrating the procedure of a preparation process performed prior to a payment process in a payment system according to a second embodiment.

A payment system according to a second embodiment of the invention is described hereinafter with reference to FIG. 8. FIG. 8 is a procedure explanatory diagram illustrating the procedure of a preparation process performed prior to a payment process in the payment system 200. Note that the procedure of a payment process performed in the payment system 200 after the preparation process is the same as that in the payment system 100 according to the first embodiment and thus not redundantly described.

The payment system 200 is a system that includes a mobile terminal 4 (one example of a payment terminal) that makes a payment with an electronic payment function (one example of a payment means), such as a mobile phone terminal or a smartphone with electronic money functionality, for example, and a reader/writer 3 (one example of a payment processing terminal) that accepts a payment by the mobile terminal 4.

Note that the mobile terminal 4 includes a contactless IC chip 41 (one example of a payment terminal), a position-money type database 42, a GPS chip 43, and a mobile application 44 (an application program for the mobile terminal 4; one example of a disabling means).

The IC chip 41 is a chip that enables payments with electronic money. Note that the functions of the IC chip 41 are the same as the functions of the IC chip 11.

The position-money type database 42 is a database that stores identification information of an electronic money type for narrowing down and selecting one from a plurality of types of electronic money (electronic money types) that are usable in the mobile terminal 4 based on the tendency of payments in the mobile terminal 4 (for example, information about an electronic money type that is recommended to be selected based on the history of positions and date and time of payments). The GPS chip 43 is an electronic module that measures the position of the mobile terminal 4.

The mobile application 44 is an application program that has a function of performing a preparation process by accessing the IC chip 41. Note that the functions of the mobile application 44 are the same as the functions of the mobile application 14 except for those explicitly described below.

First, the procedure of a preparation process that is performed prior to a payment process in the payment system 200 is described with reference to FIG. 8. In the following, the case where a user of the mobile terminal 4 visits a store and eats and drinks, for example, and then makes a payment with electronic money is described as one example.

First, when a user of the mobile terminal 4 enters a store, the user holds the mobile terminal 4 against a reader/writer for discount coupon issuance (not shown) or the like that is located at the entrance of the store, for example. Upon that act as a trigger, information about a discount coupon is displayed on the mobile terminal 4, and the mobile application 44 transmits a command to make an inquiry about position information corresponding to the current position of the mobile terminal 4 to the GPS chip 103 (procedural step 31). Note that, instead of using the act that a user of the mobile terminal 4 holds the mobile terminal 4 against a reader/writer for discount coupon issuance or the like as a trigger, detection of SSID by the mobile terminal 1 may be used as a trigger, or the GPS chip 43 may perform positioning, which is described below, on a regular basis.

Next, the GPS chip 43 performs positioning and transmits position information indicating the current position of the mobile terminal 4 and positioning time information to the mobile application 44 (procedural step 32), and the mobile application 44 makes an inquiry to the position-money type database 42 about an electronic money type that is recommended to be selected based on the history of the position information and the positioning time information and thereby acquires it (procedural step 33). It is assumed in this example that the recommended electronic money type is "electronic money type E".

Then, the mobile application 44 sends a command (polling) for capturing the IC chip 41 (which does not designate a specific code) to the IC chip 41 (procedural step 34). In response thereto, the IC chip 41 sends a response containing unique ID information and the like back to the mobile application 44 (procedural step 35).

After that, it is assumed that a process in compliance with the technical specification and the management regulations of the IC card (for example, authentication etc.) is performed between the mobile application 44 and the IC chip 41, for example.

After that, in order to temporarily disable the "electronic money type W" and the "electronic money type n" other than the recommended electronic money type, the mobile application 44 transmits the command for setting the privacy flag to ON (set privacy flag) to the IC chip 41 by specifying areas corresponding to the "electronic money type W" and the "electronic money type n" (procedural steps 36 and 38). In response thereto, the control unit of the IC chip 41 updates the privacy flag corresponding to each of the specified areas to ON, and sends a response indicating that update is normally done back to the mobile application 44 for each of them (procedural steps 37 and 39).

Note that, after the payment process in the payment system 200 is completed, the mobile application 44 transmits a command for setting the privacy flag corresponding to the areas of the disabled electronic money types to OFF to the IC chip 41 (procedural step 40).

By the procedure shown in FIG. 8, the rest of electronic money types (which are two types: "electronic money type W" and "electronic money type n" in the above example) other than the electronic money type (which is "electronic money type E" in the above example) that is recommended based on the history of tendency of using electronic money in the past in the vicinity of the current position of the mobile terminal 4 are temporarily disabled.

Further, the balance of the recommended electronic money type may be increased, using at least a part of the balance of the disabled electronic money type as a source of funds.

Further, before the rest of electronic money types (which are "electronic money type W" and "electronic money type n" in the above example) other than the recommended electronic money type (which is "electronic money type E" in the above example) are temporarily disabled in the above procedure, the mobile application 44 reduces the balance of the electronic money type to be disabled by the following procedure.

(1) The electronic money balance of the recommended electronic money type is acquired from the IC chip 41. For example, a balance reference command is generated and transmitted to the IC chip 41, and a response including the balance is received from the IC chip 41.

(2) When the acquired electronic money balance is equal to or less than a specified amount, at least a part of the electronic money balance of another electronic money type to be disabled is reduced by the mobile application 44 in coordination with the corresponding electronic money server (not shown). For example, the mobile application 44 requests the corresponding electronic money server to make reduction by specifying the amount, transfers a balance change command generated in the electronic money server to the IC chip 41, transfers a response received from the IC chip 41 to the electronic money server, and receives a notification about completion of the reduction from the electronic money server.

Then, after the disabling processing of the rest of electronic money types (which are "electronic money type W" and "electronic money type n" in the above example) other than the recommended electronic money type (which is "electronic money type E" in the above example) is completed in the above procedure, the mobile application 44 increases (replenishes) the electronic money balance of the recommended electronic money type (which is "electronic money type E" in the above example) by the following procedure.

(1) The electronic money balance of the recommended electronic money type is acquired from the IC chip 41. For example, a balance reference command is generated and transmitted to the IC chip 41, and a response including the balance is received from the IC chip 41.

(2) The electronic money balance of the recommended electronic money type is increased by the amount of reduction from the disabled electronic money type. For example, the mobile application 44 requests the corresponding electronic money server to make increase by specifying the amount, transfers a balance change command generated in the electronic money server to the IC chip 41, transfers a response received from the IC chip 41 to the electronic money server, and receives a notification about completion of the increase from the electronic money server.

To be specific, in the case where there is a tendency that the electronic money type E is used frequently at a specific business district (position) in the early weekday morning (date and time) and the electronic money type W is used frequently at a specific entertainment district (position) in the holiday evening (date and time), the rest of electronic money types other than the type E are disabled (preset) when the position is detected at the business district in the early weekday morning, and the rest of electronic money types other than the type W is disabled (preset) when the position is detected at the entertainment district in the holiday evening.

<2-2> Configuration of Payment System

Figure 9:
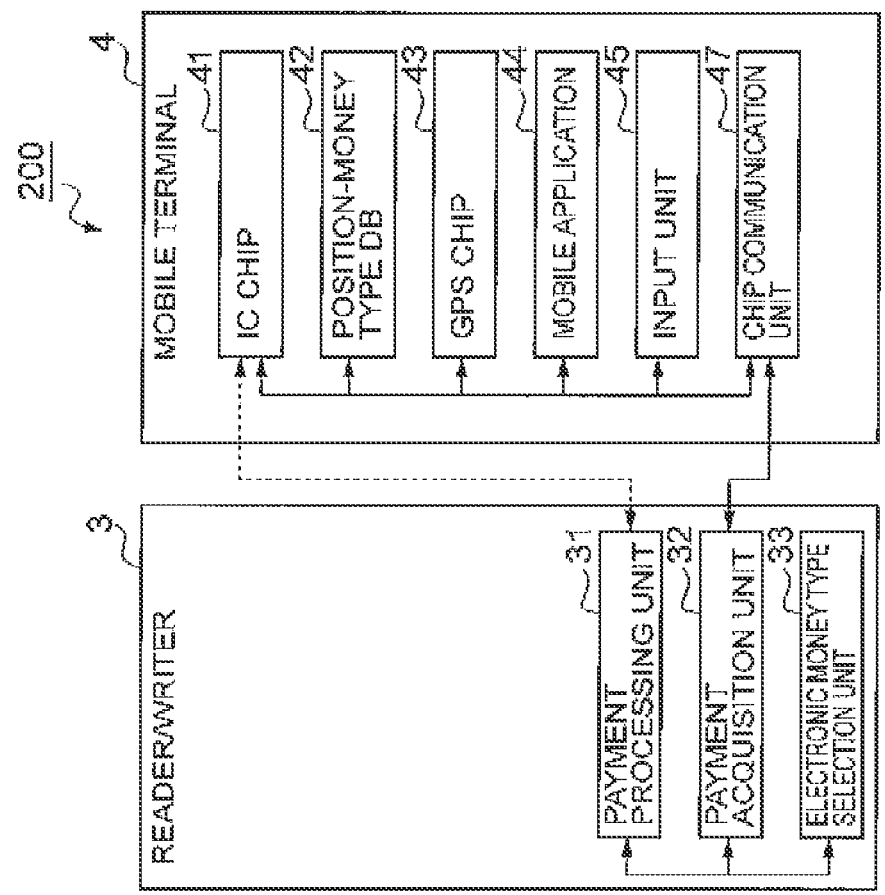
FIG. 9 is a block diagram illustrating the configuration of the payment system.

The configuration of the mobile terminal 4 included in the payment system 200 is described hereinafter with reference to FIGS. 4 to 9. FIG. 9 is a block diagram illustrating the configuration of the payment system 200. Note that the configuration of the reader/writer 3 included in the payment system 200 is the same as the reader/writer 3 according to the first embodiment and thus not redundantly described.

As shown in FIG. 4, the mobile terminal 4 is a small computer terminal that is composed of hardware such as a CPU 101 (Central Processing Unit), a RAM 102 (Random Access Memory), a ROM 103 (Read Only Memory), an operating unit 104, a wireless communication unit 105, a display 106, an antenna 107, and various chips as principal physical components. Those components operate so that the functions of the mobile terminal 4 are exerted.

As shown in FIG. 9, the mobile terminal 4 is composed of the IC chip 41 (payment means), an electronic money priority information database 42 (storage means), a GPS chip 43 (positioning means), a mobile application 44 (control means), an input unit 45 (input means), and a chip communication unit 47 (communication means) as principal functional components.

The IC chip 41 is a semiconductor integrated circuit unit that is capable of making payments with a plurality of electronic money types. The plurality of electronic money types include "electronic money type E", "electronic money type W" and "electronic money type n", for example.

The position-money type database 42 is a database that stores electronic money type identification information (selection information) for narrowing down and selecting one specific electronic money type from a plurality of types of electronic money (electronic money types) that are usable in the mobile terminal 4 based on the tendency of payments in the mobile terminal 4 (for example, information about an electronic money type that is recommended to be selected based on the history of positions and date and time of payments).

The GPS chip 43 is a positioning unit that acquires position information related to the current position of the mobile terminal 4 and the date and time by using GPS (Global Positioning System).

The mobile application 44 is an application unit that makes an inquiry about information related to an electronic money type that is recommended to be selected based on the history of the position information acquired by the GPS chip 43 and the information about the date and time when positioning is performed by the GPS chip 43 and thereby acquires the those information.

Note that the mobile application 44 can perform disabling processing of the rest of electronic money types based on a tendency of a change in the current position of the mobile terminal 4 at certain date and time acquired by the GPS chip 43. For example, in the case where there is a tendency that the electronic money type E is used frequently at a specific business district in the early weekday morning and the electronic money type W is used frequently at a specific entertainment district in the holiday evening, the rest of electronic money types other than the type E are disabled when the position is detected at the business district in the early weekday morning, and the rest of electronic money types other than the type W is disabled when the position is detected at the entertainment district in the holiday evening.

The input unit 45 is a user interface unit that receives input of specifying information that specifies the rest of electronic money types to be disabled. The specifying information is input by a user of the mobile terminal 4.

The chip communication unit 47 is a communication unit that controls near field communication that is performed with the reader/writer 3.

<2-3> Flow of Process in Payment System

Figure 10:
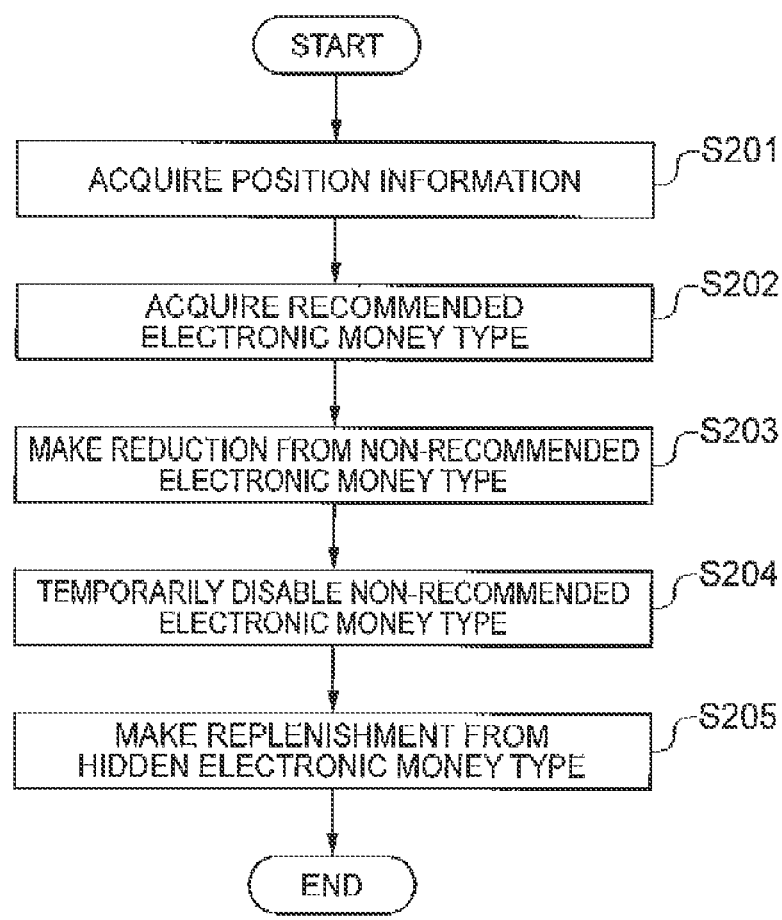
FIG. 10 is a flowchart showing the flow of the preparation process performed prior to the payment process in the payment system.

The flow of the process (payment processing method) executed in the payment system 200 is described hereinafter with reference to FIG. 10. FIG. 10 is a flowchart showing the flow of the preparation process performed prior to the payment process in the payment system 2. Note that the flow of the payment process performed in the payment system 200 after the preparation process is the same as that in the payment system 100 according to the first embodiment and thus not redundantly described.

In the following, the case where a user of the mobile terminal 4 visits a store and eats and drinks, for example, and then makes a payment with electronic money is described as one example.

First, when a user of the mobile terminal 4 enters a store, the user holds the mobile terminal 4 against a reader/writer for discount coupon issuance (not shown) or the like that is located at the entrance of the store, for example. Upon that act as a trigger, information about a discount coupon is displayed on the mobile terminal 4, and the mobile terminal 4 performs positioning, thereby acquires position information indicating the current position of the mobile terminal 4 (Step S201). Then, the mobile terminal 4 acquires identification information that is capable of identifying (identifies) an electronic money type that is recommended to be selected based on the position information and the positioning time information (Step S202). It is assumed in this example that the recommended electronic money type is "electronic money type E".

Next, the mobile terminal 4 reduces at least a part of the non-recommended electronic money type other than the above-described recommended electronic money type (which is "electronic money type E" in the above example) (Step S203). Then, the mobile terminal 4 temporarily disables each of the rest of electronic money types other than the above-described recommended electronic money type (Step S204).

Then, the mobile terminal 4 increases (replenishes) the electronic money balance of the recommended electronic money type (which is "electronic money type E" in the above example) by the amount of reduction from the non-recommended electronic money type (which is the amount reduced in Step S203) (Step S205).

<2-4> Payment Processing Program

A payment program for causing a computer to function as the mobile terminal 4 is provided in the form of being recorded in a static manner on a recording medium such as CD-ROM, DVD-ROM or semiconductor memory, for example. Further, the payment program may be provided as computer data signals superimposed onto carrier waves through a communication network.

<3> Advantageous Effects of First Embodiment and Second Embodiment

In the payment systems 100 and 200, the disabling processing that temporarily disables the rest of electronic money types other than one specific electronic money type among a plurality of electronic money types usable for payments is performed first in the mobile terminal. On the other hand, the reader/writer performs processing that makes inquiries about each of a plurality of acceptable electronic money types, and payment processing with one electronic money type selected from the electronic money types found to be available is performed. Therefore, in the case where the disabling processing of the rest of electronic money types other than one specific electronic money type is performed in the mobile terminal, the availableness of only one specific electronic money type that is not disabled is found by the reader/writer.

Accordingly, the electronic money type (payment means) that is less likely to be selected by a user is not recognized as a usable payment means. As a result, there is no need to let a user take the trouble to make selection among choices including an electronic money type that is less likely to be selected.

<4> Alternative Example

In the first embodiment and the second embodiment of the invention, the rest of electronic money types (payment means) other than one specific electronic money type among a plurality of electronic money types usable for payments in the IC chip (payment terminal) of the mobile terminal is temporarily disabled. As a result, only one specific electronic money type is found by the reader/writer (payment processing terminal).

However, the number of electronic money types that are not disabled is not limited to one.

For example, when the number of electronic money types usable for payments in the IC chip (payment terminal) of the mobile terminal is three or more, the electronic money type other than two specific electronic money types may be temporarily disabled.

In this embodiment also, the electronic money type (payment means) that is less likely to be selected by a user is temporarily disabled, and it is thereby possible to prevent the occurrence of the problem that the electronic money type is recognized as a usable the electronic money type in the reader/writer 3 (payment processing terminal) having the function of sequentially making inquiries about usable electronic values.

Further, for example, the mobile terminal may check the balance of a plurality of electronic money types (payment means) usable for payments in the IC chip on a regular basis and temporarily disable the electronic money type where the balance is equal to or less than a specified threshold.

In this embodiment also, the electronic money type (payment means) that is less likely to be selected by a user is temporarily disabled, and it is thereby possible to prevent the occurrence of the problem that the electronic money type is recognized as a usable the electronic money type in the reader/writer 3 (payment processing terminal) having the function of sequentially making inquiries about usable electronic values.

Although the position-money type database 42 is included in the mobile terminal 4 according to the second embodiment of the invention, the location of the position-money type database 42 is not particularly limited, and the information server 2 according to the first embodiment which can wirelessly communicate with the mobile terminal 4 may include the position-money type database 42.

<5> Supplementary Explanation

Further, in the first and second embodiments of the invention, the form where a polling command for capturing the IC card or the IC chip is used and the form where commands for acquiring an area in the IC card or the IC chip and unique ID of the area are used are described as examples based on particular technical specifications. The present invention, however, is not limited to those, and it may be implemented in form in compliance with the technical specification of the payment system to which it is applied.

INDUSTRIAL APPLICABILITY

According to the present invention, it is possible to eliminate the need for a user of a mobile device to select electronic money to use and thereby enhance the convenience for the user.

REFERENCE SIGNS LIST 1,4 . . . mobile terminal, 2 . . . information server, 3 . . . reader/writer, 11,41 . . . IC chip, 12 . . . electronic money priority information database, 13,43 . . . GPS chip, 14, 44 . . . mobile application, 15, 45 . . . input unit, 16,46 . . . flag storage area, 17,47 . . . chip communication unit, 21 . . . position-type database, 22 . . . type-availableness database, 31 . . . payment processing unit, 32 . . . payment acquisition unit, 33 . . . electronic money type selection unit, 42 . . . position-money type database, 100, 200 . . . payment system, 101,201 . . . CPU, 102,202 . . . RAM, 103,203 . . . ROM, 104 . . . operating unit, 105 . . . wireless communication unit, 106 . . . display, 107 . . . antenna, 108 . . . various chips, 204 . . . communication module, 205 . . . auxiliary storage device

The invention claimed is:
1. A mobile terminal having a plurality of types of electronic money functions capable of executing payment processing with a payment processing terminal, comprising:
   at least one memory operable to store program code;
   at least one processor operable to read the program code and operate as instructed by the program code, the program code including:
      selection code configured to cause the at least one processor to select an electronic money function to be temporarily disabled among the plurality of types of electronic money functions;
      disabling code configured to cause the at least one processor to temporarily disable, before the payment processing is executed, the electronic money function selected by the selection code, the temporarily disabling being performed irrespectively of communication with the payment processing terminal; and
      cancellation code configured to cause the at least one processor to cancel the disabling of the electronic money function by the disabling code after the payment processing is completed, wherein the mobile terminal further comprises a global positioning chip (GPS) configured to detect a position of the mobile terminal, and the selection code is further configured to cause the at least one processor to acquire an electronic money function corresponding to the detected position of the mobile terminal by referring to a database that stores position information and at least one electronic money function in association with each other, and select the electronic money function to be temporarily disabled among the plurality of types of electronic money functions based on the acquired electronic money function.

2. The mobile terminal according to claim 1, wherein the selection code causes the at least one processor to select the electronic money function to be temporarily disabled according to usage of the mobile terminal.

3. The mobile terminal according to claim 1, wherein at least a part of a usable balance of the electronic money function selected by the selection code is reduced before the electronic money function is disabled by the disabling code, and the reduced amount of balance is added to a usable balance of another specific electronic money function different from the electronic money function selected by the selection code among the plurality of types of electronic money functions.

4. The mobile terminal according to claim 1, wherein at least a part of a usable balance of the electronic money function selected by the selection code is set as security before the electronic money function is disabled by the disabling code, and the balance set as security is added as a reserve fund to a usable balance of another specific electronic money function different from the electronic money function selected by the selection code among the plurality of types of electronic money functions, and when the reserve fund is used in the other specific electronic money function, the usable balance of the electronic money function selected by the selection code is reduced by an amount equal to an amount of use of the reserve fund after the disabling of the electronic money function is cancelled by the cancellation code.

5. The mobile terminal according to claim 1, further comprising at least one IC chip operable to execute the payment processing by using the plurality of types of electronic money functions.

6. The mobile terminal according to claim 5, wherein the at least one memory operable to store key information for the temporarily disabling and cancelling of the disabling.

7. The mobile terminal according to claim 1, wherein the selection code causes the at least one processor to acquire the electronic money function by referring to the database that stores position information and an electronic money function acceptable in the payment processing terminal corresponding to the position information in association with each other, and select the electronic money function to be temporarily disabled among the plurality of types of electronic money functions, the selected electronic money function being other than the acquired electronic money function.

8. The mobile terminal according to claim 1, wherein the selection code causes the at least one processor to acquire the electronic money function by referring to a payment history storage that stores a record of an electronic money function used for payment, a time of the payment, and a position in which the payment is performed, and select the electronic money function to be temporarily disabled among the plurality of types of electronic money functions, the selected electronic money function being other than the acquired electronic money function.

9. The mobile terminal according to claim 1, wherein the database stores the position information and the at least one electronic money function to be temporarily disabled or not to be temporarily disabled at a position corresponding the position information in association with each other.

10. The mobile terminal according to claim 1, wherein the electronic money function comprises at least one from among a prepaid stored-value electronic money function, a postpaid stored-value electronic money function, a prepaid center management electronic money function, and a credit function.

11. A system comprising:
a mobile terminal having a plurality of types of electronic money functions capable of executing payment processing with a payment processing terminal, comprising:
at least one memory operable to store program code;
at least one processor operable to read the program code and operate as instructed by the program code, the program code including:
selection code configured to cause the at least one processor to select an electronic money function to be temporarily disabled among the plurality of types of electronic money functions;
disabling code configured to cause the at least one processor to temporarily disable, before the payment processing is executed, the electronic money function selected by the selection code, the temporarily disabling being performed irrespectively of communication with the payment processing terminal; and
cancellation code configured to cause the at least one processor to cancel the disabling of the electronic money function by the disabling code after the payment processing is completed; and
the payment processing terminal, in response to determining that there are a plurality of specific electronic money functions not disabled by the disabling code among the plurality of types of electronic money functions, configured to display a list of the plurality of specific electronic money functions on a specified screen so that a user of the mobile terminal can select at least one among the plurality of specific electronic money functions to be used for the payment processing, wherein
the mobile terminal further comprises a global positioning chip (GPS) configured to detect a position of the mobile terminal, and
the selection code is further configured to cause the at least one processor to acquire an electronic money function corresponding to the detected position of the mobile terminal by referring to a database that stores position information and at least one electronic money function in association with each other, and select the electronic money function to be temporarily disabled among the plurality of types of electronic money functions based on the acquired electronic money function.

12. A payment processing method by a mobile terminal having a plurality of types of electronic money functions capable of executing payment processing with a payment processing terminal, comprising:
a selection step of selecting an electronic money function to be temporarily disabled among the plurality of types of electronic money functions;

a disabling step of temporarily disabling, before the payment processing is executed, the electronic money function selected in the selection step, the temporarily disabling being performed irrespectively of communication with the payment processing terminal; and a cancellation step of canceling the disabling of the electronic money function performed in the disabling step after the payment processing is completed, wherein the mobile terminal further comprises a global positioning chip (GPS) configured to detect a position of the mobile terminal, and the payment processing method further comprises:
- acquiring an electronic money function corresponding to the detected position of the mobile terminal by referring to a database that stores position information and at least one electronic money function in association with each other, and
- selecting the electronic money function to be temporarily disabled among the plurality of types of electronic money functions based on the acquired electronic money function.

\* \* \* \* \*